United States Patent
Feng et al.

(10) Patent No.: US 6,489,583 B1
(45) Date of Patent: Dec. 3, 2002

(54) SHIMMED ELECTRON BEAM WELDING PROCESS

(75) Inventors: Ganjiang Feng, Clifton Park, NY (US); Daniel Anthony Nowak, Alplaus, NY (US); John Thomas Murphy, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 3 days.

(21) Appl. No.: 09/638,072

(22) Filed: Aug. 11, 2000

(51) Int. Cl.[7] .............................................. B23K 15/00
(52) U.S. Cl. ................................................. 219/121.14
(58) Field of Search ....................... 219/121.12, 121.13, 219/121.14, 121.35

(56) References Cited

U.S. PATENT DOCUMENTS

| | | | |
|---|---|---|---|
| 3,456,092 A | | 7/1969 | Rush et al. |
| 3,617,685 A | * | 11/1971 | Brill-Edwards et al. ................. 219/121.14 |
| 3,831,499 A | * | 8/1974 | Andrews et al. ................ 92/45 |
| 4,205,118 A | * | 5/1980 | Schubert ...................... 428/594 |
| 4,288,677 A | * | 9/1981 | Sakata et al. .......... 219/121.14 |
| 4,492,846 A | * | 1/1985 | Hara et al. ............. 219/121.13 |
| 5,897,801 A | | 4/1999 | Smashey et al. |

FOREIGN PATENT DOCUMENTS

| | | |
|---|---|---|
| FR | 2 093 322 | 1/1972 |
| GB | 1031801 | 6/1966 |
| WO | WO 96/22854 | 8/1996 |

OTHER PUBLICATIONS

Metals Handbook Ninth Edition, "Electron Beam Welding", vol. 6, pp. 609–646, copyright 1983.*

"39th GE Turbine State-of-the-Art Technology Seminar", Tab 1, ""F" Technology—the First Half-Million Operating Hours", H.E. Miller.

"39th GE Turbine State-of-the-Art Technology Seminar", Tab, 2, "GE Heavy-Duty Gas Turbine Performance Characteristics", F. J. Brooks.

(List continued on next page.)

*Primary Examiner*—Samuel M. Heinrich
(74) *Attorney, Agent, or Firm*—Nixon & Vanderhye P.C.

(57) ABSTRACT

A modified electron beam welding process effects welding of joints between superalloy materials by inserting a weldable shim in the joint and heating the superalloy materials with an electron beam. The process insures a full penetration of joints with a consistent percentage of filler material and thereby improves fatigue life of the joint by three to four times as compared with the prior art. The process also allows variable shim thickness and joint fit-up gaps to provide increased flexibility for manufacturing when joining complex airfoil structures and the like.

7 Claims, 1 Drawing Sheet

OTHER PUBLICATIONS

"39th GE Turbine State–of–the–Art Technology Seminar", Tab, 3, "9EC 50Hz 170–MW Class Gas Turbine", A. S. Arrao.

"39th GE Turbine State–of–the–Art Technology Seminar", Tab, 4, "MWS6001FA—An Advanced–Technology 70–MW Class 50/60 Hz Gas Turbine", Ramachandran et al.

"39th GE Turbine State–of–the–Art Technology Seminar", Tab, 5, "Turbomachinery Technology Advances at Nuovo Pignone", Benvenuti et al.

"39th GE Turbine State–of–the–Art Technology Seminar", Tab, 6, "GE Aeroderivative Gas Turbine—Design and Operating Features", M.W. Homer.

"39th GE Turbine State–of–the–Art Technology Seminar", Tab, 7, "Advance Gas Turbine Materials and Coatings", P.W. Schilke.

"39th GE Turbine State–of–the–Art Technology Seminar", Tab, 8, "Dry Low $NO_x$ Combustion Systems for GE Heavy–Duty Turbines", L. B. Davis.

"39th GE Turbine State–of–the–Art Technology Seminar", Tab, 9, "GE Gas Turbine Combustion Flexibility", M. A. Davi.

"39th GE Turbine State–of–the–Art Technology Seminar", Tab, 10, "Gas Fuel Clean–Up System Design Considerations for GE Heavy–Duty Gas Turbines", C. Wilkes.

"39th GE Turbine State–of–the–Art Technology Seminar", Tab, 11, "Integrated Control Systems for Advanced Combined Cycles", Chu et al.

"39th GE Turbine State–of–the–Art Technology Seminar", Tab, 12, "Power Systems for the 21st Century "H" Gas Turbine Combined Cycles", Paul et al.

"39th GE Turbine State–of–the–Art Technology Seminar", Tab, 13, "Clean Coal and Heavy Oil Technologies for Gas Turbines", D. M. Todd.

"39th GE Turbine State–of–the–Art Technology Seminar", Tab, 14, "Gas Turbine Conversions, Modifications and Uprates Technology", Stuck et al.

"39th GE Turbine State–of–the–Art Technology Seminar", Tab, 15, "Performance and Reliability Improvements for Heavy–Duty Gas Turbines," J. R. Johnston.

"39th GE Turbine State–of–the–Art Technology Seminar", Tab, 16, "Gas Turbine Repair Technology", Crimi et al.

"39th GE Turbine State–of–the–Art Technology Seminar", Tab, 17, "Heavy Duty Turbine Operating & Maintenance Considerations", R. F. Hoeft.

"39th GE Turbine State–of–the–Art Technology Seminar", Tab, 18, "Gas Turbine Performance Monitoring and Testing", Schmitt et al.

"39th GE Turbine State–of–the–Art Technology Seminar", Tab, 19, "Monitoring Service Delivery System and Diagnostics", Madej et al.

"39th GE Turbine State–of–the–Art Technology Seminar", Tab, 20, "Steam Turbines for Large Power Applications", Reinker et al.

"39th GE Turbine State–of–the–Art Technology Seminar", Tab, 21, "Steam Turbines for Ultrasupercritical Power Plants", Retzlaff et al.

"39th GE Turbine State–of–the–Art Technology Seminar", Tab, 22, "Steam Turbine Sustained Efficiency", P. Schofield.

"39th GE Turbine State–of–the–Art Technology Seminar", Tab, 23, "Recent Advances in Steam Turbines for Industrial and Cogeneration Applications", Leger et al.

"39th GE Turbine State–of–the–Art Technology Seminar", Tab, 24, "Mechanical Drive Steam Turbines", D. R. Leger.

"39th GE Turbine State–of–the–Art Technology Seminar", Tab, 25, "Steam Turbines for STAG™ Combined–Cycle Power Systems", M. Boss.

"39th GE Turbine State–of–the–Art Technology Seminar", Tab, 26, "Cogeneration Application Considerations", Fisk et al.

"39th GE Turbine State–of–the–Art Technology Seminar", Tab, 27, "Performance and Economic Considerations of Repowering Steam Power Plants", Stoll et al.

"39th GE Turbine State–of–the–Art Technology Seminar", Tab, 28, "High–Power–Density™ Steam Turbine Design Evolution", J. H. Moore.

"39th GE Turbine State–of–the–Art Technology Seminar", Tab, 29, "Advances in Steam Path Technologies", Cofer, IV, et al.

"39th GE Turbine State–of–the–Art Technology Seminar", Tab, 30, "Upgradable Opportunites for Steam Turbines", D. R. Dreier, Jr.

"39th GE Turbine State–of–the–Art Technology Seminar", Tab, 31, "Uprate Options for Industrial Turbines", R. C. Beck.

"39th GE Turbine State–of–the–Art Technology Seminar", Tab, 32, "Thermal Performance Evaluation and Assessment of Steam Turbine Units", P. Albert.

"39th GE Turbine State–of–the–Art Technology Seminar", Tab, 33, "Advances in Welding Repair Technology" J. F. Nolan.

"39th GE Turbine State–of–the–Art Technology Seminar", Tab, 34, "Operation and Maintenance Strategies to Enhance Plant Profitability", MacGillivray et al.

"39th GE Turbine State–of–the–Art Technology Seminar", Tab, 35, "Generator Insitu Inspections", D. Stanton.

"39th GE Turbine State–of–the–Art Technology Seminar", Tab, 36, "Generator Upgrade and Rewind", Halpern et al.

"39th GE Turbine State–of–the–Art Technology Seminar", Tab, 37, "GE Combined Cycle Product Line and Performance", Chase, et al.

"39th GE Turbine State–of–the–Art Technology Seminar", Tab, 38, "GE Combined Cycle Experience", Maslak et al.

"39th GE Turbine State–of–the–Art Technology Seminar", Tab, 39, "Single–Shaft Combined Cycle Power Generation Systems", Tomlinson et al.

"Advanced Turbine System Program—Conceptual Design and Product Development", Annual Report, Sep. 1, 1994–Aug. 31, 1995.

"Advanced Turbine Systems (ATS Program) Conceptual Design and Product Development", Final Technical Progress Report, vol. 2—Industrial Machine, Mar. 31, 1997, Morgantown, WV.

"Advanced Turbine Systems (ATS Program), Conceptual Design and Product Development", Final Technical Progress Report, Aug. 31, 1996, Morgantown, WV.

"Advanced Turbine Systems (ATS) Program, Phase 2, Conceptual Design and Product Development", Yearly Technical Progress Report, Reporting Period: Aug. 25, 1993–Aug. 31, 1994.

"Advanced Turbine Systems" Annual Program Review, Preprints, Nov. 2–4, 1998, Washington, D.C. U.S. Department of Energy, Office of Industrial Technologies Federal Energy Technology Center.

"ATS Conference" Oct. 28, 1999, Slide Presentation.

"Baglan Bay Launch Site", various articles relating to Baglan Energy Park.

"Baglan Energy Park", Brochure.

"Commercialization", Del Williamson, Present, Global Sales, May 8, 1998.

"Environmental, Health and Safety Assessment: ATS 7H Program (Phase 3R) Test Activities at the GE Power Systems Gas Turbine Manufacturing Facility, Greenville, SC", Document #1753, Feb. 1998, Publication Date: Nov. 17, 1998, Report Nos. DE–FC21–95MC31176—11.

"Exhibit panels used at 1995 product introduction at PowerGen Europe".

"Extensive Testing Program Validates High Efficiency, reliability of GE's Advanced "H" Gas Turbine Technology", Press Information, Press Release, 96–NR14, Jun. 26, 1996, H Technology Tests/pp. 1–4.

"Extensive Testing Program Validates High Efficiency, Reliability of GE's Advanced "H" Gas Turbine Technology", GE Introduces Advanced Gas Turbine Technology Platform: First to Reach 60% Combined–Cycle Power Plant Efficiency, Press Information, Press Release, Power–Gen Europe '95, 95–NRR15, Advanced Technology Introduction/pp. 1–6.

"Gas, Steam Turbine Work as Single Unit in GE's Advanced H Technology Combined–Cycle System", Press Information, Press Release, 95–NR18, May 16, 1995, Advanced Technology Introduction/pp. 1–3.

"GE Breaks 60% Net Efficiency Barrier" paper, 4 pages.

"GE Businesses Share Technologies and Experts to Develop State–Of–The–Art Products", Press Information, Press Release 95–NR10, May 16, 1995, GE Technology Transfer/pp. 1–3.

"General Electric ATS Program Technical Review, Phase 2 Activities", T. Chance et al., pp. 1–4.

"General Electric's DOE/ATS H Gas Turbine Development" Advanced Turbine Systems Annual Review Meeting, Nov. 7–8, 1996, Washington, D.C., Publication Release.

"H Technology Commercialization", 1998 MarComm Activity Recommendation, Mar., 1998.

"H Technology", Jon Ebacher, VP, Power Gen Technology, May 8, 1998.

"H Testing Process", Jon Ebacher, VP, Power Gen Technology, May 8, 1998.

"Heavy–Duty & Aeroderivative Products" Gas Turbines, Brochure, 1998.

"MS7001H/MS9001H Gas Turbine, gepower.com website for PowerGen Europe" (Jun. 1–3 going public Jun. 15, 1995).

"New Steam Cooling System is a Key to 60% Efficiency For GE "H" Technology Combined–Cycle Systems", Press Information, Press Release, 95–NRR16, May 16, 1995, H Technology/pp. 1–3.

"Overview of GE's H Gas Turbine Combined Cycle", Jul. 1, 1995 to Dec. 31, 1997.

"Power Systems for the 21$^{st}$ Century—"H" Gas Turbine Combined Cycles", Thomas C. Paul et al., Report.

"Power–Gen '96 Europe", Conference Programme, Budapest, Hungary, Jun. 26–28, 1996.

"Power–Gen International", 1998 Show Guide, Dec. 9–11, 1998, Orange County Convention Center, Orlando, Florida.

"Press Coverage following 1995 product announcement"; various newspaper clippings relating to improved generator.

"Proceedings of the Advanced Turbine Systems Annual Program Review Meeting"; vol. I. "Industrial Advanced Turbine Systems Program Overview", D.W. Esbeck, p. 3.

"Proceedings of the Advanced Turbine Systems Annual Program Review Meeting", vol. I, "H Gas Turbine Combined Cycle", J. Corman, p. 14.

"Proceedings of the Advanced Turbine Systems Annual Program Review Meeting", vol. I, "Overview of Westinghouse's Advanced Turbine Systems Program", Bannister et al., p. 22.

"Proceedings of the Advanced Turbine Systems Annual Program Review Meeting", vol. I, "Allison Engine ATS Program Technical Review", D. Mukavetz, p. 31.

"Proceedings of the Advanced Turbine Systems Annual Program Review Meeting", vol. I, "Advanced Turbine Systems Program Industrial System Concept Development", S. Gates, p. 43.

"Proceedings of the Advanced Turbine Systems Annual Program Review Meeting", vol. I, "Advanced Turbine System Program Phase 2 Cycle Selection", Latcovich, Jr., p. 64.

"Proceedings of the Advanced Turbine Systems Annual Program Review Meeting", vol. I, "General Electric ATS Program Technical Review Phase 2 Activities", Chance et al., p. 70.

"Proceedings of the Advanced Turbine Systems Annaul Program Review Meeting", vol. I, "Technical Review of Westinghouse's Advanced Turbine Systems Program", Diakunchak et al., p. 75.

"Proceedings of the Advanced Turbine Systems Annual Program Review Meeting", vol. I, "Advanced Combustion Turbines and Cycles: An EPRI Perspective", Touchton et al., p. 87.

"Proceedings of the Advanced Turbine Systems Annual Program Review Meeting", vol. I, "Advanced Turbine Systems Annaul Program Review", William E. Koop, p. 89.

"Proceedings of the Advanced Turbine Systems Annual Program Review Meeting", vol. I, "The AGTSR Consortium: An Update", Fant et al., p. 93.

"Proceedings of the Advanced Turbine Systems Annual Program Review Meeting", vol. I, "Overview of Allison/AGTSR Interactions", Sy A. Ali, p. 103.

"Proceedings of the Advanced Turbine Systems Annual Program Review Meeting", vol. I, "Design Factors for Stable Lean Premix Combustion", Richards et al., p. 107.

"Proceedings of the Advanced Turbine Systems Annual Program Review Meeting", vol. I, "Ceramic Stationary as Turbine", M. van Roode, p. 114.

"Proceedings of the Advanced Turbine Systems Annual Program Review Meeting", vol. I, "DOE/Allison Ceramic Vane Effort", Wenglarz et al., p. 148.

"Proceedings of the Advanced Turbine Systems Annual Program Review Meeting", vol. I, "Materials/Manufacturing Element of the Advanced Turbine Systems Program", Karnitz et al., p. 152.

"Proceedings of the Advanced Turbine Systems Annual Program Review Meeting", vol. I, "Land–Based Turbine Casting Initiative", Mueller et al., p. 161.

"Proceedings of the Advanced Turbine Systems Annual Program Review Meeting", vol. I, "Pratt & Whitney Thermal Barrier Coatings", Bornstein et al., p. 182.

"Proceedings of the Advanced Turbine Systems Annual Program Review Meeting", vol. I, "Westinhouse Thermal Barrier Coatings", Goedjen et al., p. 194.

"Proceedings of the Advanced Turbine Systems Annual Program Review Meeting", vol. I, "High Performance Steam Development", Duffy et al., p. 200.

"Proceedings of the Advanced Turbine Systems Annual Program Review Meeting", vol. II, "Lean Premixed Combustion Stabilized by Radiation Feedback and heterogeneous Catalysis", Dibble et al., p. 221.

"Proceedings of the Advanced Turbine Systems Annual Program Review Meeting", vol. II, Rayleigh/Raman/LIF Measurements in a Turbulent Lean Premixed Combustor, Nandula et al. p. 233.

"Proceedings of the Advanced Turbine Systems Annual Program Review Meeting", vol. II, "Lean Premixed Flames for Low $NO_x$ Combustors", Sojka et al., p. 249.

"Proceedings of the Advanced Turbine Systems Annual Program Review Meeting", vol. II, "Functionally Gradient Materials for Thermal Barrier Coatings in Advanced Gas Turbine Systems", Banovic et al., p. 276.

"Proceedings of the Advanced Turbine Systems Annual Program Review Meeting", vol. II, "Advanced Turbine Cooling, Heat Transfer, and Aerodynamic Studies", Han et al., p. 281.

"Proceedings of the Advanced Turbine Systems Annual Program Review Meeting", vol. II, "Life Prediction of Advanced Materials for Gas Turbine Application", Zamrik et al., p. 310.

"Proceedings of the Advanced Turbine Systems Annual Program Review Meeting", vol. II, "Advanced Combustion Technologies for Gas Turbine Power Plants", Vansburger et al., p. 328.

"Proceedings of the Advanced Turbine Systems Annual Program Review Meeting", vol. II, "Combustion Modeling in Advanced Gas Turbine Systems", Smoot et al., p. 353.

"Proceedings of the Advanced Turbine Systems Annual Program Review Meeting", vol. II, "Heat Transfer in a Two–Pass Internally Ribbed Turbine Blade Coolant Channel with Cylindrical Vortex Generators", Hibbs et al. p. 371.

"Proceedings of the Advanced Turbine Systems Annual Program Review Meeting", vol. II, "Rotational Effects of Turbine Blade Cooling", Govatzidakia et al., p. 391.

"Proceedings of the Advanced Turbine Systems Annual Program Review Meeting", vol. II, "Manifold Methods for Methane Combustion", Yang et al., p. 393.

"Proceedings of the Advanced Turbine Systems Annaul Program Review Meeting", vol. II, "Advanced Multistage Turbine Blade Aerodynamics, Performance, Cooling, and Heat Transfer", Fleeter et al., p. 410.

"Proceedings of the Advanced Turbine Systems Annaul Program Review Meeting", vol. II, "Advanced Multistage Turbine Blade Aerodynamics, Performance, Cooling, and Heat Transfer", Fleeter et al., p. 410.

"Proceedings of the Advanced Turbine Systems Annual Program Review Meeting", vol. II, "Experimental and Computational Studies of Film Cooling With Compound Angle Injection", Goldstein et al., p. 423.

"Proceedings of the Advanced Turbine Systems Annual Program Review Meeting", vol. II, "Compatibility of Gas Turbine Materials with Steam Cooling", Desai et al., p. 452.

"Proceedings of the Advanced Turbine Systems Annual Program Review Meeting", vol. II, "Use of a Laser–Induced Fluorescence Thermal Imaging System for Film Cooling Heat Transfer Measurement", M. K. Chyu, p. 465.

"Proceedings of the Advanced Turbine Systems Annual Program Review Meeting", vol. II, Effects of Geometry on Slot–Jet Film Cooling Performance Hyams et al., p. 474.

"Proceedings of the Advanced Turbine Systems Annual Program Review Meeting", vol. II, "Steam as Turbine Blade Coolant: Experimental Data Generation", Wilmsen et al., p. 497.

"Proceedings of the Advanced Turbine Systems Annual Program Review Meeting", vol. II, "Combustion Chemical Vapor Deposited Coatings for Thermal Barrier Coating Systems", Hampikian et al., p. 506.

"Proceedings of the Advanced Turbine Systems Annual Program Review Meeting", vol. II, "Premixed Burner Experiments: Geometry, Mixing, and Flame Structure Issues", Gupta et al., p. 516.

"Proceedings of the Advanced Turbine Systems Annual Program Review Meeting", vol. II, "Intercooler Flow Path for Gas Turbines: CFD Design and Experiments", Agrawal et al., p. 529.

"Proceedings of the Advanced Turbine Systems Annual Program Review Meeting", vol. II, "Bond Strength and Stress Measurements in Thermal Barrier Coatings", Gell et al., p. 539.

"Proceedings of the Advanced Turbine Systems Annual Program Review Meeting", vol. II, "Active Control of Combustion Instabilities in Low $NO_x$ Gas Turbines", Zinn et al., p. 550.

"Proceedings of the Advanced Turbine Systems Annual Program Review Meeting", vol. II, "Combustion Instability Modeling and Analysis", Santoro et al., p. 552.

"Proceedings of the Advanced Turbine Systems Annual Program Review Meeting", vol. II, "Flow and Heat Transfer in Gas Turbine Disk Cavities Subject to Nonuniform External Pressure Field", Roy et al., p. 560.

"Proceedings of the Advanced Turbine Systems Annual Program Review Meeting", vol. II, "Heat Pipe Turbine Vane Cooling", Langston et al., p. 566.

"Proceedings of the Advanced Turbine Systems Annual Program Review Meeting", vol. II, "Improved Modeling Techniques for Turbomachinery Flow Fields", Lakshminarayana et al., p. 573.

"Proceedings of the Advanced Turbine Systems Annual Program Review Meeting", vol. II, "Advanced 3D Inverse Method for Designing Turbomachine Blades", T. Dang, p. 582.

"Proceedings of the Advanced Turbine Systems Annual Program Review Meeting", "ATS and the Industries of the Future", Denise Swink, p. 1.

"Proceedings of the Advanced Turbine Systems Annual Program Review Meeting", "Gas Turbine Association Agenda", William H. Day, p. 3.

"Proceedings of the Advanced Turbine Systems Annual Program Review Meeting", "Power Needs in the Chemical Industry", Keith Davidson, p. 17.

"Proceedings of the Advanced Turbine Systems Annual Program Review Meeting", "Advanced Turbine Systems Program Overview", David Esbeck, p. 27.

"Proceedings of the Advanced Turbine Systems Annual Program Review Meeting", "Westinghouse's Advanced Turbine Systems Program", Gerard McQuiggan, p. 35.

"Proceedings of the Advanced Turbine Systems Annual Program Review Meeting", "Overview of GE's H Gas Turbine Combined Cycle", Cook et al., p. 49.

"Proceedings of the Advanced Turbine Systems Annual Program Review Meeting", "Allison Advanced Simple Cycle Gas Turbine System", William D. Weisbrod, p. 73.

"Proceedings of the Advanced Turbine Systems Annual Program Review Meeting", "The AGTSR Industry–University Consortium", Lawrence P. Golan, p. 95.

"Proceedings of the Advanced Turbine Systems Annual Program Review Meeting", "$NO_x$ and CO Emissions Models for Gas–Fired Lean–Premixed Combustion Turbines", A. Mellor, p. 111.

"Proceedings of the Advanced Turbine Systems Annual Program Review Meeting", "Methodologies for Active Mixing and Combustion Control", Uri Vandsburger, p. 123.

"Proceedings of the Advanced Turbine Systems Annual Program Review Meeting", "Combustion Modeling in Advanced Gas Turbine Systems", Paul O. Hedman, p. 157.

"Proceedings of the Advanced Turbine Systems Annual Program Review Meeting", "Manifold Methods for Methane Combustion", Stephen B. Pope, p. 181.

"Proceedings of the Advanced Turbine Systems Annual Program Review Meeting", "The Role of Reactant Unmixedness, Strain Rate, and Length Scale on Premixed Combustor Performance", Scott Samuelsen, p. 189.

"Proceedings of the Advanced Turbine Systems Annual Program Review Meeting", "Effect of Swirl and Momentum Distribution on Temperature Distribution in Premixed Flames", Ashwani K. Gupta, p. 211.

"Proceedings of the Advanced Turbine Systems Annual Program Review Meeting", "Combustion Instability Studies Application to Land–Based Gas Turbine Combustors", Robert J. Santoro, p. 233.

"Proceedings of the Advanced Turbine Systems Annual Program Review Meeting", Active Control of Combustion Instabilitiesin Low $NO_x$ Turbines, Ben T. Zinn, p. 253.

"Proceedings of the Advanced Turbine Systems Annual Program Review Meeting", "Life Prediction of Advanced Materials for Gas Turbine Application," Sam Y. Zamrik, p. 265.

"Proceedings of the Advanced Turbine Systems Annual Program Review Meeting", "Combustion Chemical Vapor Deposited Coatings for Thermal Barrier Coating Systems", W. Brent Carter, p. 275.

"Proceedings of the Advanced Turbine Systems Annual Program Review Meeting", "Compatibility of Gas Turbine Materials with Steam Cooling", Vimal Desai, p. 291.

"Proceedings of the Advanced Turbine Systems Annual Program Review Meeting", "Bond Strength and Stress Measurements in Thermal Barrier Coatings", Maurice Gell, p. 315.

"Proceedings of the Advanced Turbine Systems Annual Program Review Meeting", "Advanced Multistage Turbine Blade Aerodynamics, Performance, Cooling and Heat Transfer", Sanford Fleeter, p. 335.

"Proceedings of the Advanced Turbine Systems Annual Program Review Meeting", "Flow Characteristics of an Intercooler System for Power Generating Gas Turbines", Ajay K. Agrawal, p. 357.

"Proceedings of the Advanced Turbine Systems Annual Program Review Meeting", "Improved Modeling Techniques for Turbomachinery Flow Fields", B. Lakshiminarayana, p. 371.

"Proceedings of the Advanced Turbine Systems Annual Program Review Meeting", "Development of an Advanced 3d & Viscous Aerodynamic Design Method for Turbomachine Components in Utility and Industrial Gas Turbine Applications", Thong Q. Dang, p. 393.

"Proceedings of the Advanced Turbine Systems Annual Program Review Meeting", "Advanced Turbine Cooling, Heat Transfer, and Aerodynamic Studies", Je–Chin Han, p. 407.

"Proceedings of the Advanced Turbine Systems Annual Program Review Meeting", "Heat Transfer in a Two–Pass Internally Ribbed Turbine Blade Coolant Channel with Vortex Generators", S. Acharya, p. 427.

"Proceedings of the Advanced Turbine Systems Annual Program Review Meeting", "Experimental and Computational Studies of Film Cooling with Compound Angel Injection", R. Goldstein, p. 447.

"Proceedings of the Advanced Turbine Systems Annual Program Review Meeting", "Study of Endwall Film Cooling with a Gap Leakage Using a Thermographic Phosphor Fluorescence Imaging System", Mingking K. Chyu, p. 461.

"Proceedings of the Advanced Turbine Systems Annual Program Review Meeting", "Steam as a Turbine Blade Coolant: External Side Heat Transfer", Abraham Engeda, p. 471.

"Proceedings of the Advanced Turbine Systems Annual Program Review Meeting", "Flow and Heat Transfer in Gas Turbine Disk Cavities Subject to Nonuniform External Pressure Field", Ramendra Roy, p. 483.

"Proceedings of the Advanced Turbine Systems Annual Program Review Meeting", "Closed–Loop Mist/Steam Cooling for Advanced Turbine Systems", Ting Wang, p. 499.

"Proceedings of the Advanced Turbine Systems Annual Program Review Meeting", "Heat Pipe Turbine Vane Cooling", Langston et al., p. 513.

"Proceedings of the Advanced Turbine Systems Annual Program Review Meeting", "EPRI's Combustion Turbine Program: Status and Future Directions", Arthur Cohn, p. 535.

"Proceedings of the Advanced Turbine Systems Annual Program Review Meeting", "ATS Materials Support", Michael Karnitz, p. 553.

"Proceedings of the Advaned Turbine Systems Annual Program Review Meeting", "Land Based Turbine Casting Initiative", Boyd A. Mueller, p. 577.

"Proceedings of the Advanced Turbine Systems Annual Program Review Meeting", "Turbine Airfoil Manufacturing Technology", Charles S. Kortovich, p. 593.

"Proceedings of the Advanced Turbine Systems Annual Program Review Meeting", "Hot Corrosion Testing of TBS's", Norman Bornstein, p. 623.

"Proceedings of the Advanced Turbine Systems Annual Program Review Meeting", "Ceramic Stationary Gas Turbine", Mark van Roode, p. 633.

"Proceedings of the Advanced Turbine Systems Annual Program Review Meeting", "Western European Status of Ceramics for Gas Turbines", Tibor Bornemisza, p. 659.

"Proceedings of the Advanced Systems Annual Program Review Meeting", "Status of Ceramic Gas Turbines in Russia", Mark van Roode, p. 671.

"Status Report: The U.S. Department of Energy's Advanced Turbine systems Program", facsimile dated Nov. 7, 1996.

"Testing Program Results Validate GE's H Gas Turbine—High Efficiency, Low Cost of Electricity and Low Emissions", Roger Schonewald and Patrick Marolda.

"Testing Program Results Validate GE's H Gas Turbine—High Efficiency, Low Cost of Electricity and Low Emissions", Slide Presentation—working draft.

"The Next Step In H . . . For Low Cost Per kW–Hour Power Generation", LP–1 PGE '98.

"Utility Advanced Turbine System (ATS) Technology Readiness Testing and Pre–Commercialization Demonstration", Document #486040, Oct. 1,–Dec. 31, 1996, Publication Date, Jun. 1, 1997, Report Nos. DOE/MC/31176—5628.

"Utility Advanced Turbine System (ATS) Technology Readiness Testing—Phase 3", Document #666274, Oct. 1, 1006–Sep. 30, 1997, Publication Date, Dec. 31, 1997, Report Nos.: DOE/MC/31176—10.

"Utility Advanced Turbine System (ATS) Technology Readiness Testing and Pre–Commercial Demonstration, Phase 3", Document #486029, Oct. 1–Dec. 31, 1995, Publication Date, May 1, 1997, Report Nos.: DOE/MC/31176—5340.

"Utility Advanced Turbine System (ATS) Technology Readiness Testing and Pre–Commercial Demonstration—Phase 3", Document #486132, Apr. 1–Jun. 30, 1976, Publication Date, Dec. 31, 1996, Report Nos.: DOE/MC/31176—5660.

"Utility Advanced Turbine System (ATS) Technology Readiness Testing and Pre–Commercial Demonstration—Phase 3", Document #587906, Jul. 1–Sep. 30, 1995, Publication Date, Dec. 31, 1995, Report Nos.: DOE/MC/31176—5339.

"Utility Advanced Turbine System (ATS) Technology Readiness Testing and Pre–Commercial Demonstration" Document #666277, Apr. 1–Jun. 30, 1997, Publication Date, Dec. 31, 1997, Report Nos.: DOE/MC/31176—8.

"Utility Advanced Turbine System (ATS) Technology Readiness Testing and Pre–Commercialization Demonstration" Jan. 1–Mar. 31, 1996, DOE/MC/31176—5338.

"Utility Advanced Turbine System (ATS) Technology Readiness Testing: Phase 3R", Document #756552, Apr. 1–Jun. 30, 1999, Publication Date, Sep. 1, 1999, Report Nos.: DE—FC21–95MC31176–23.

"Utility Advanced Turbine System (ATS) Technology Readiness Testing.", Documetn #656823, Jan. 1–Mar. 31, 1998, Publication Date, Aug. 1, 1998, Report Nos.: DOE/MC/31176–17.

"Utility Advanced Turbine Systems (ATS) Technology Readiness Testing and Pre–Commercial Demonstration", Annual Technical Progress Report, Reportin Period: Jul. 1, 1995–Sep. 30, 1996.

"Utility Advanced Turbine Systems (ATS) Technology Readiness Testing", Phase 3R, Annual Technical Progress Report, Reportin Period: Oct. 1, 1997–Sep. 30, 1998.

"Utility Advanced Turbine Systemss (ATS) Technology Readiness Testing", Document #750405, Oct. 1–Dec. 30, 1998, Publication Date: May 1, 1999, Report Nos.: DE–FC21–95MC31176–20.

"Utility Advanced Turbine Systems (ATS) Technology Readiness Testing", Document #1348, Apr. 1–Jun. 29, 1998, Publication Date Oct. 29, 1998, Report Nos. DE–FC21–95MC31176—18.

"Utility Advanced Turbine Systems (ATS) Technology Readiness Testing—Phase 3", Annual Technical Progress Report, Reporting Period: Oct. 1, 1996–Sep. 30, 1997.

"Utility Advanced Turbine Systems (ATS) Technology Readiness Testing and Pre–Commercial Demonstration", Quarterly Report, Jan. 1–Mar. 31, 1997, Document #666275, Report Nos.: DOE/MC/31176–07.

"Proceedings of the 1997 Advanced Turbine Systems", Annual Program Review Meeting, Oct. 28–29, 1997.

* cited by examiner

SHIMMED ELECTRON BEAM WELDING PROCESS

This invention was made with Government support under Contract No. DE-FC21-95MC-31176 awarded by the Department of Energy. The Government has certain rights in this invention.

BACKGROUND OF THE INVENTION

This invention relates to electron beam welding and, more particularly, to a modified electron beam welding process for joining superalloy materials.

Nickel-base or Cobalt-base superalloys are alloys containing about 50% or more by weight of nickel, plus alloying elements that are added to improve the mechanical and physical properties of these alloys. These materials are typically used in aircraft and industry gas turbine components and other applications that require good strength, creep resistance, fracture toughness, and other mechanical properties at elevated temperatures for extended periods of time.

Single crystal nickel-base superalloys, like Rene N5, that contain greater than 10% refractory elements are generally viewed as unweldable. However, use of a low heat input welding process such as laser or electron beam has produced crack free weld joints over a very narrow range of welding conditions. One drawback to these beam processes is the directional grain growth in the fusion zone that forms a distinct dendritic boundary in the center of the weld zone. This type of grain structure makes the joint vulnerable to centerline cracking and results in poor fatigue strength. For example, the fatigue life of electron beam welded N5 material at 1200° F. and 0.9% strain fails at about 100 cycles, which is much lower than that of the base metal. Weld property levels in this range can result in catastrophic failure of the weld joint during operation in a gas turbine.

Alternative processes have been developed for welding the Rene N5 material to overcome the centerline cracking problems. Among them, a wire feed electron beam welding process and a gas tungsten arc welding process (TIG) were the best performers in improving fatigue life of the joint. The wire feed electron beam process adds a ductile filler metal through an automatic wire feeder during electron beam welding. Because of the increased ductility of the weld metal, the fatigue life of the wire feed EB joint was greatly improved. It was evident, however, that this process was limited by the joint thickness. Lack of penetration defects often occurred when the joint thickness was increased to 0.3 inches. The TIG welding process also used a ductile filler metal. This multi-pass arc process completely changed the directional grain structure in the weld zone and also introduced ductile filler metal into the weld metal. This high heat input arc welding process, however, caused relatively large airfoil distortions and increased the risk of lack of fusion defects in the weld. Often, the amount of distortion prohibited the use of the TIG process as the primary welding process for complex airfoil structures.

BRIEF SUMMARY OF THE INVENTION

In an exemplary embodiment of the invention, a method of electron beam welding a joint between superalloy materials includes the steps of inserting a weldable shim in the joint and heating the superalloy materials with an electron beam. The shim may be formed of a superalloy material. For a 0.3 inches thick joint, the heating step preferably comprises powering the electron beam with a voltage between 100–130 kV and a current between 25–35 mA at a speed of 20–30 ipm. With this method, the heating step can be completed in a single pass.

In another exemplary embodiment of the invention, a method of welding a joint gap up to at least 0.040 inches between superalloy materials includes the steps of inserting a shim in the gap and heating the superalloy materials with an electron beam. The joint gap in fact may be up to 0.100 inches.

DETAILED DESCRIPTION OF THE INVENTION

Figure 1:
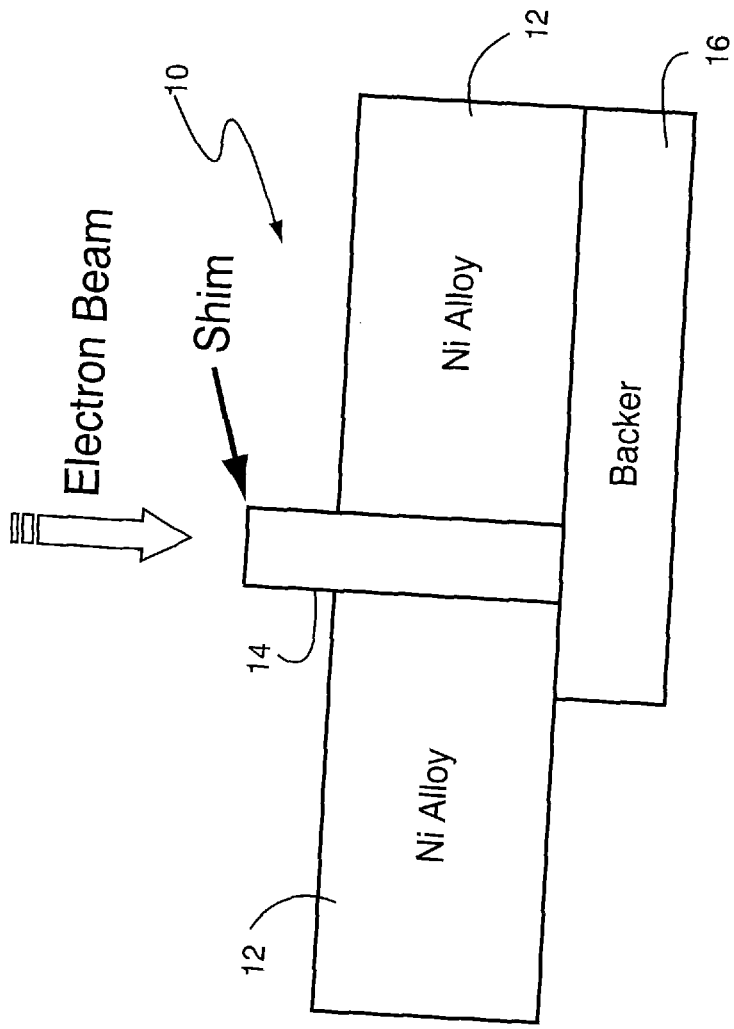
FIG. 1 is a schematic illustration of the electron beam welding process of the present invention.

Superalloy materials, and particularly nickel-base or Cobalt-base superalloys are useful in gas turbine components that require good strength, creep resistance, fracture toughness and other mechanical properties at elevated temperatures. Such materials are used, for example, in turbine buckets and first and second stage nozzles where the materials are subject to high temperatures as well as high stress and strain during turbine operation.

The electron beam source serves to heat the joint to be welded. As would be apparent to those of ordinary skill in the art, any known electron beam source could be used, and the invention is not meant to be limited to a particular structural configuration. Moreover, the apparatus generating the electron beam for performing electron beam welding is known, and except for the description below with respect to preferred operating parameters, the details of the electron beam generating apparatus will not be further described.

Referring to FIG. 1, a butt joint or joint gap 10 between components 12 formed of superalloy materials is fit with a shim 14. The method of the present invention is applicable for welding any superalloy materials, but is particularly suited for single crystal nickel-base superalloys such as Rene N5, which is utilized in gas turbines and the like. The shim 14 is preferably formed of a ductile superalloy material such as IN617, IN625 or HA230. The thickness of the shim is variable depending on a size of the gap between the materials to be welded. As with the conventional process, a backer 16 is supported adjacent the joint 10 to prevent the electron beam from damaging unintended surfaces. The backer 16 may also be formed of a superalloy material, which may be separate or integrated piece of the material to be welded.

The parameters for operation of the electron beam are variable according to desired results as is known. In the present context, it is preferable to power the electron beam with a voltage between 100–130 kV and a current between 25–35 mA. Lower values of voltage and/or current can result in fusion defects because of only partial penetration, thereby considerably reducing the cyclic fatigue life of the joint. Voltage and/or current values too high can result in cutting through the metals. The travel speed is preferably about 20–30 inches per minute (ipm) and is controlled to vary a heat input from the electron beam. Heat input is a function of voltage and current divided by travel speed. Thus, if the travel speed is too low, the joint may become overheated, whereas if the travel speed is too high, there may be fusion defects as a result of a shallow weld. Other welding parameters, such as oscillation, frequency and focus, are less pertinent than voltage, current and speed noted above. These parameters, however, can be modified according to known principles to effect modifications in the welding operation.

With the welding process of the present invention, fatigue life of a welded joint can be increased by three to four times compared with the prior art. The process also insures a full penetration of a butt joint up to six inches in depth with a consistent percentage of filler material in a single pass. By eliminating the need for a multi-pass welding process, risks for lack of fusion type defects are significantly reduced. The process allows variable shim thickness and joint fit-up gaps up to 0.040 inch and as much as 0.100 inch, which provides increased flexibility for manufacturing when joining complex airfoil structures and the like.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A method of electron beam welding a joint between superalloy materials, the method comprising inserting a weldable shim of nickel-base superalloy in the joint and heating the superalloy materials with an electron beam, wherein the heating step comprises powering the electron beam with a voltage between 100–130 kV and a current between 25–35 mA at a speed of 20–30 ipm.

2. A method according to claim 1, wherein the shim is formed by wrought, cast, or powder metallurgy processes.

3. A method according to claim 1, wherein the heating step is completed in a single pass.

4. A method of welding a joint gap up to at least 0.040 in. between superalloy materials, the method comprising inserting a nickel-base superalloy shim in the gap and heating the superalloy materials with an electron beam, wherein the heating step comprises powering the electron beam with a voltage between 100–130 kV and a current between 25–35 mA at a speed of 20–30 ipm.

5. A method according to claim 4, wherein the joint gap is up to 0.100 in.

6. A method according to claim 4, wherein the shim is formed by wrought, cast or powder metallurgy processes.

7. A method according to claim 4, wherein the heating step is completed in a single pass.

* * * * *